US012683246B2

(12) United States Patent
Morimura et al.

(10) Patent No.: US 12,683,246 B2
(45) Date of Patent: Jul. 14, 2026

(54) SEPARATOR FOR NON-AQUEOUS SECONDARY BATTERY AND NON-AQUEOUS SECONDARY BATTERY

(71) Applicant: TEIJIN LIMITED, Osaka (JP)

(72) Inventors: Wataru Morimura, Osaka (JP); Satoshi Nishikawa, Osaka (JP)

(73) Assignee: TEIJIN LIMITED, Osaka (JP)

( * ) Notice: Subject to any disclaimer, the term of this patent is extended or adjusted under 35 U.S.C. 154(b) by 710 days.

(21) Appl. No.: 17/801,416

(22) PCT Filed: Feb. 19, 2021

(86) PCT No.: PCT/JP2021/006331
§ 371 (c)(1),
(2) Date: Aug. 22, 2022

(87) PCT Pub. No.: WO2021/172196
PCT Pub. Date: Sep. 2, 2021

(65) Prior Publication Data
US 2023/0155248 A1     May 18, 2023

(30) Foreign Application Priority Data

Feb. 28, 2020     (JP) ................................. 2020-034134

(51) Int. Cl.
| | |
|---|---|
| *H01M 50/451* | (2021.01) |
| *H01M 10/0525* | (2010.01) |
| *H01M 10/0569* | (2010.01) |
| *H01M 50/417* | (2021.01) |
| *H01M 50/423* | (2021.01) |
| *H01M 50/446* | (2021.01) |
| *H01M 50/489* | (2021.01) |

(52) U.S. Cl.
CPC ..... *H01M 50/451* (2021.01); *H01M 10/0525* (2013.01); *H01M 10/0569* (2013.01); *H01M 50/417* (2021.01); *H01M 50/423* (2021.01); *H01M 50/446* (2021.01); *H01M 50/489* (2021.01); *H01M 2300/0028* (2013.01)

(58) Field of Classification Search
CPC ............. H01M 50/451; H01M 50/417; H01M 50/423; H01M 50/446; H01M 50/449; H01M 50/489; H01M 10/0525; H01M 10/0569; H01M 2300/0028; C08J 2377/10
See application file for complete search history.

(56) References Cited

U.S. PATENT DOCUMENTS

| | | | |
|---|---|---|---|
| 2009/0130547 A1 | 5/2009 | Lee et al. | |
| 2010/0068612 A1 | 3/2010 | Nishikawa | |
| 2010/0288692 A1* | 11/2010 | Kakzau | D04H 1/43838 |
| | | | 428/401 |
| 2011/0165450 A1 | 7/2011 | Nishikawa | |
| 2011/0165469 A1 | 7/2011 | Nishikawa | |
| 2012/0115008 A1 | 5/2012 | Sano et al. | |
| 2013/0029202 A1 | 1/2013 | Son et al. | |
| 2013/0171501 A1 | 7/2013 | Son et al. | |
| 2013/0224560 A1 | 8/2013 | Yoshitomi | |
| 2013/0273408 A1 | 10/2013 | Yoshitomi et al. | |
| 2015/0372276 A1 | 12/2015 | Mizuno et al. | |
| 2017/0005321 A1 | 1/2017 | Sugata et al. | |
| 2017/0117525 A1 | 4/2017 | Suzuki | |
| 2017/0125763 A1* | 5/2017 | Inatomi | H01M 10/0525 |
| 2017/0155109 A1* | 6/2017 | Hasegawa | H01M 50/463 |
| 2017/0155123 A1 | 6/2017 | Hasegawa | |
| 2018/0190957 A1 | 7/2018 | Honda et al. | |
| 2019/0088917 A1 | 3/2019 | Katada et al. | |
| 2020/0035969 A1 | 1/2020 | Kondo et al. | |
| 2020/0161618 A1 | 5/2020 | Adams et al. | |
| 2021/0210818 A1 | 7/2021 | Park et al. | |

FOREIGN PATENT DOCUMENTS

| | | | |
|---|---|---|---|
| CN | 102241832 A | 11/2011 | |
| JP | 2005-123091 A | 5/2005 | |
| JP | 2010-092717 A | 4/2010 | |
| JP | 2016-72142 A | 5/2016 | |
| JP | 2016-91963 A | 5/2016 | |
| JP | 2017-103208 A | 6/2017 | |
| JP | 2018-141136 A | 9/2018 | |
| JP | 2019-216033 A | 12/2019 | |
| KR | 10-2010-0068483 A | 6/2010 | |
| KR | 10-2016-0129598 A | 11/2016 | |
| WO | 2008/062727 A1 | 5/2008 | |
| WO | 2015/146579 A1 | 10/2015 | |
| WO | 2019/059440 A1 | 3/2019 | |
| WO | 2020/013671 A1 | 1/2020 | |

OTHER PUBLICATIONS

International Search Report for PCT/JP2021/006331, dated Apr. 27, 2021.

* cited by examiner

*Primary Examiner* — Aiqun Li
(74) *Attorney, Agent, or Firm* — Sughrue Mion, PLLC

(57)     ABSTRACT

A separator for a non-aqueous secondary battery contains: a porous layer that is provided on only one side of the porous substrate, and that contains a resin having at least one bonding group selected from an amide bond, an imide bond, and a sulfonyl bond, in which, in the porous substrate, an absolute value of a difference between a temperature of an endothermic peak observed at 120° C. to 145° C., in a temperature raising process 1, and a temperature of an endothermic peak observed at 120° C. to 145° C., in a temperature raising process 2, is 1.50° C. or higher in DSC measurement when the temperature raising process 1 of continuously raising the temperature from 30° C. to 200° C. at a temperature change rate of 5° C./min in a nitrogen atmosphere, and the temperature raising process 2 of lowering the temperature from 200° C. to 30° C. and raising the temperature from 30° C. to 200° C., are performed.

10 Claims, No Drawings

SEPARATOR FOR NON-AQUEOUS SECONDARY BATTERY AND NON-AQUEOUS SECONDARY BATTERY

CROSS REFERENCE TO RELATED APPLICATIONS

This application is a National Stage of International Application No. PCT/JP2021/006331 filed Feb. 19, 2021, claiming priority based on Japanese Patent Application No. 2020-034134 filed Feb. 28, 2020.

TECHNICAL FIELD

The present disclosure relates to a separator for a non-aqueous secondary battery and a non-aqueous secondary battery.

BACKGROUND ART

Non-aqueous secondary batteries typified by lithium ion secondary batteries are widely used as power supplies for portable electronic devices such as notebook computers, mobile phones, digital cameras, and camcorders. As a separator provided in a non-aqueous secondary battery, a separator in which a substrate such as a polyethylene film is coated with a layer containing polyamide (also referred to as aramid), and a separator in which nylon is kneaded into a polyethylene film are conventionally known.

For example, as disclosed in WO 2008/062727 A, a separator in which a polyethylene film is coated with a layer containing aramid is usually coated with aramid on both sides of the polyethylene film. Since the coating of aramid is performed on both sides of the polyethylene film, the produced separator inevitably has a certain thickness, and thus, it is difficult to reduce the thickness.

In addition, aramid or nylon has a polar group in molecules. Therefore, the separator using aramid or nylon has characteristics of being easily charged with static electricity and poor in slippage. When the separator is charged with static electricity, foreign matters adhere during manufacturing, and a defect may occur. When the slipperiness of the separator is deteriorated, for example, in a manufacturing process in which a wound body obtained by winding the separator and the electrode in an overlapping manner using a winding core is pulled out from the winding core, a phenomenon in which the wound body extends in a bamboo shoot shape and loses its shape or a phenomenon in which wrinkles are formed in the wound body may occur.

In view of the above, when the coating film is provided on the substrate, the coating film is preferably provided only on one side of the substrate. For example, a separator for a non-aqueous electrolyte battery having a layer containing a heat-resistant nitrogen-containing aromatic polymer on one side of a substrate is disclosed (see, for example, Japanese Patent No. 3175730).

SUMMARY OF INVENTION

Technical Problem

However, in an aspect in which a coating film is provided only on one side of a substrate such as a polyethylene film, there is a problem that an electrolytic solution hardly permeates into a separator as compared with the aspect in which the coating film is provided on both sides of the polyethylene film. When the electrolytic solution does not sufficiently permeate into the separator, a resistance value (film resistance) of the separator increases, and desired battery characteristics cannot be expected by the technique described in Japanese Patent No. 3175730.

The present disclosure has been made in view of the above circumstances.

An object of an embodiment of the present disclosure is to provide a separator for a non-aqueous secondary battery into which an electrolytic solution easily permeates.

An object of another embodiment of the present disclosure is to provide a non-aqueous secondary battery having excellent battery characteristics.

Solution to Problem

Specific means for solving the problems include the following aspects.

<1>A separator for a non-aqueous secondary battery, the separator containing:

a porous substrate including a polyolefin microporous film; and a porous layer that is provided on only one side of the porous substrate, and that contains a resin having at least one bonding group selected from the group consisting of an amide bond, an imide bond, and a sulfonyl bond, wherein, in the porous substrate, an absolute value of a difference between a temperature of an endothermic peak observed at from 120° C. to 145° C., in a temperature raising process 1, and a temperature of an endothermic peak observed at from 120° C. to 145° C. in a temperature raising process 2, is 1.50° C. or higher in differential scanning calorimetry (DSC) measurement when the temperature raising process 1 of continuously raising the temperature from 30° C. to 200° C. at a temperature change rate of 5° C./min in a nitrogen atmosphere, and the temperature raising process 2 of lowering the temperature from 200° C. to 30° C. and raising the temperature from 30° C. to 200° C., are performed.

<2> The separator for a non-aqueous secondary battery according to <1>, wherein the porous layer contains inorganic particles.

<3> The separator for a non-aqueous secondary battery according to <1> or <2>, wherein the resin contains a wholly aromatic polyamide.

<4> The separator for a non-aqueous secondary battery according to any one of <1> to <3>, wherein a Macmillan number Mn determined by the following formula is 20 or less:

$$Mn=(\sigma e)/(\sigma s)$$

$$\sigma s=t/Rm$$

wherein $\sigma e$ represents a conductivity (S/m) of an electrolytic solution at 20° C. obtained by dissolving 1 mol/l of $LiPF_6$ in a mixed solvent (mixing ratio 1:1 [mass ratio]) of ethylene carbonate and propylene carbonate, $\sigma s$ represents a conductivity (S/m) of the separator impregnated with the electrolytic solution at 20° C., t represents a film thickness (m), and Rm represents a film resistance (ohm·cm²) of the separator.

<5> The separator for a non-aqueous secondary battery according to any one of <1> to <4>, wherein the porous layer has a thickness of from 0.3 μm to 5.0 μm.

<6> The separator for a non-aqueous secondary battery according to any one of <1> to <5>, wherein the resin is provided inside a pore of the porous substrate and on a surface of the porous substrate on a side opposite to a side having the porous layer.

<7>A non-aqueous secondary battery that obtains electromotive force by lithium doping and dedoping, the non-aqueous secondary battery containing:

a positive electrode;

a negative electrode;

the separator for a non-aqueous secondary battery according to any one of <1> to <6>disposed between the positive electrode and the negative electrode; and an electrolytic solution in which a lithium salt is dissolved in a solvent containing a cyclic carbonate in an amount of 90% by mass or more based on a total mass of the solvent.

Advantageous Effects of Invention

According to an embodiment of the present disclosure, it is possible to provide a separator for a non-aqueous secondary battery into which an electrolytic solution easily permeates.

According to another embodiment of the present disclosure, it is possible to provide a non-aqueous secondary battery having excellent battery characteristics.

DESCRIPTION OF EMBODIMENTS

Hereinafter, the contents of the present disclosure will be described in detail.

The description of the components described below may be made based on a representative embodiment of the present disclosure, but the present disclosure is not limited to such an embodiment.

A numerical range represented by using "to" in the present specification means a range including numerical values described before and after "to" as a lower limit value and an upper limit value. In a numerical range described in stages in the present disclosure, an upper limit value or a lower limit value described in a certain numerical range may be replaced with an upper limit value or a lower limit value of another described numerical range in stages. In addition, in the numerical range described in the present disclosure, an upper limit value or a lower limit value described in a certain numerical range may be replaced with a value shown in Examples.

In the present specification, when the amount of each component in a composition is referred to and when a plurality of substances corresponding to each component are present in the composition, the total amount of the plurality of components present in the composition is meant unless otherwise specified.

The term "solid content" in the present specification means a component excluding a solvent, and liquid components such as low molecular weight components other than the solvent are also included in the "solid content" in the present specification.

In the present specification, the term "solvent" is used to mean to include water, an organic solvent, and a mixed solvent of water and an organic solvent.

In the present specification, the term "process" includes not only an independent process but also a process that cannot be clearly distinguished from other processes as long as the intended purpose of the process is achieved.

Note that in the present disclosure, a combination of preferable aspects is a more preferable aspect.

A weight-average molecular weight (Mw) in the present disclosure is a value measured by gel permeation chromatography (GPC).

Specifically, a sample of the polyethylene microporous membrane is heated and dissolved in o-dichlorobenzene, and Mw is obtained by performing measurement by GPC (Alliance GPC 2000 type manufactured by Waters Corporation, column: GMH6-HT and GMH6-HTL) under the conditions of a column temperature of 135° C. and a flow rate of 1.0 mL/min. For calibration of the molecular weight, molecular weight monodisperse polystyrene (manufactured by Tosoh Corporation) can be used.

<Separator for Non-aqueous Secondary Battery>

A separator (hereinafter, also referred to as a "separator of the present disclosure" or a "separator") for a non-aqueous secondary battery according to the present disclosure includes: a porous substrate including a polyolefin microporous film; and a porous layer that is provided on only one side of the porous substrate, and that contains a resin having at least one bonding group selected from the group consisting of an amide bond, an imide bond, and a sulfonyl bond, in which, in the porous substrate, an absolute value of a difference (hereinafter, also simply referred to as "difference between temperatures of endothermic peaks".) between a temperature of an endothermic peak observed at from 120° C. to 145° C., in a temperature raising process 1, and a temperature of an endothermic peak observed at from 120° C. to 145° C. in a temperature raising process 2, is 1.50° C. or higher in differential scanning calorimetry (DSC) measurement when the temperature raising process 1 of continuously raising the temperature from 30° C. to 200° C. at a temperature change rate of 5° C./min in a nitrogen atmosphere, and the temperature raising process 2 of lowering the temperature from 200° C. to 30° C. and raising the temperature from 30° C. to 200° C., are performed.

Conventionally, as the separator provided in the non-aqueous secondary battery, for example, a separator having a three-layer structure in which layers containing aramid are coated on both sides of a polyethylene film is known. Then, the separator using aramid or nylon has characteristics of being easily charged with static electricity and poor in slippage. Due to such characteristics, there may be problems such as adhesion of foreign matters during manufacturing and generation of defects, and collapse of shape or wrinkles in a wound body manufactured by winding a separator and an electrode around a winding core.

In view of such a situation, in the separator for a non-aqueous secondary battery of the present disclosure, a porous layer containing a specific resin is formed only on one side of the porous substrate. As a result, the entire separator can be thinned, and defects due to static electricity, deformation, wrinkles, and the like are suppressed from occurring. However, in a state in which the porous layer is formed only on one side of the porous substrate and the porous layer is not formed on the other side and the surface of the porous substrate is exposed, affinity with the electrolytic solution is poor, and therefore there is a risk that the separator is not impregnated with the electrolytic solution in an amount required from the viewpoint of battery characteristics. When the impregnation of the electrolytic solution is insufficient, desired battery characteristics cannot be expected.

In view of this point, in the separator for a non-aqueous secondary battery according to the present disclosure, the porous layer contains a resin having a bonding group selected from the group consisting of an amide bond, an imide bond, and a sulfonyl bond, and in the porous substrate to which the porous layer adheres, an absolute value of a difference between a temperature of an endothermic peak observed at from 120° C. to 145° C., in a temperature raising process 1, and a temperature of an endothermic peak observed at from 120° C. to 145° C. in a temperature raising process 2, is 1.50° C. or higher in differential scanning calorimetry (DSC) measurement when the temperature raising process 1 of continuously raising the temperature from 30° C. to 200° C. at a temperature change rate of 5° C./min in a nitrogen atmosphere, and the temperature raising process 2 of lowering the temperature from 200° C. to 30° C. and raising the temperature from 30° C. to 200° C., are performed.

The reason why the separator for a non-aqueous secondary battery of the present disclosure having such a configuration exerts an effect is not necessarily clear, but is estimated as follows.

First, the porous layer contains a resin having at least one bonding group selected from the group consisting of an amide bond, an imide bond, and a sulfonyl bond. As a result, since the resin has the bonding group selected from an amide bond, an imide bond, or a sulfonyl bond, the affinity for the porous substrate (in particular, a polyethylene film) is improved, and the affinity with the electrolytic solution is also high, so permeability of the electrolytic solution into the porous layer is improved.

Next, for the porous substrate to which the porous layer adheres, an absolute value of a difference between a temperature of an endothermic peak observed at from 120° C. to 145° C. in each of the temperature raising process 1 and the temperature raising process 2, is 1.50° C. or higher in DSC measurement when the temperature raising process 1 of continuously raising the temperature from 30° C. to 200° C. at a temperature change rate of 5° C./min in a nitrogen atmosphere, and the temperature raising process 2 of lowering the temperature from 200° C. to 30° C. and raising the temperature from 30° C. to 200° C., are performed. The temperature of the endothermic peak in the temperature raising process I reflects a history of changes in a crystalline state caused by physical deformation of the porous substrate. That is, when the porous substrate is a substrate that has been subjected to a stretching treatment, the temperature represents a melting temperature that appears due to the influence of both crystals in which spherulites present in the unstretched substrate are changed, and spherulites remaining without being changed, when the porous substrate is stretched. The endothermic peak in the temperature raising process 2 reflects a state in which the history of the deformation is eliminated by the heat in the temperature raising process 1. That is, it represents the crystal state of the substrate before physical deformation is applied, in other words, the melting temperature of only the spherulites.

Here, the porous substrate is constituted by a large number of polyethylene (PE) molecules intertwined in a network, the spherulite refers to a portion where a plurality of PE molecular chains are intertwined and become spherical, and the crystal refers to a portion where a plurality of PE molecular chains which are straightly extended are aligned. The state of the molecular structure such as the spherulites can be confirmed by a scanning electron microscope or a transmission electron microscope.

In the above description, the difference (absolute value) between the temperature of the endothermic peaks in the temperature raising process 1 and the temperature of the endothermic peak in the temperature raising process 2 represents a quantitative change of crystals caused by the physical deformation such as the stretching with respect to the spherulites. That is, the difference between the temperatures of the endothermic peaks in the two temperature raising processes represents the degree of physical deformation (for example, in the case of a stretched film or the like subjected to a stretching treatment, the degree to which the stretching treatment has been performed) applied to the porous substrate, and the fact that the difference in temperatures is large means that there are many crystals in the substrate. That is, the porous substrate in the present disclosure has a structure having many crystal portions.

In the present disclosure, it is presumed that the fact that the difference between the temperatures of the endothermic peaks in the two temperature raising processes is 1.50° C. or higher means that the porous substrate is a substrate in a state in which a portion of spherulites is reduced by physical treatment such as stretching, and the crystalline state in the substrate affects the adhesion of the electrolytic solution, and as a result, the porous substrate exhibits a liquid permeation action.

From the viewpoint of battery characteristics, it is important that the separator for a non-aqueous secondary battery has a property that the substrate is easily impregnated with the electrolytic solution, and when the difference between the temperatures of the endothermic peaks in the two temperature raising processes is 1.50° C. or higher, it can be said that the electrolytic solution easily permeates.

As described above, since both the functions of the porous layer and the porous substrate are combined, in the separator for a non-aqueous secondary battery according to the present disclosure, the permeation of the electrolytic solution easily proceeds quickly, and the separator that is well impregnated with the electrolytic solution is easily obtained.

(Porous Substrate)

The porous substrate in the present disclosure may be a substrate having a polyolefin microporous film containing at least polyethylene, and may be a substrate made of a polyolefin microporous film containing polyethylene.

The porous substrate has a structure in which a plurality of pores are provided inside the layer and the plurality of pores are connected to each other, and is configured to pass a gas or a liquid from one side to the other side of the layer. The same applies to the polyolefin microporous film.

In the porous substrate in the present disclosure, an absolute value (difference in temperature between endothermic peaks) of a difference between a temperature of an endothermic peak observed at from 120° C. to 145° C., in a temperature raising process 1, and a temperature of an endothermic peak observed at from 120° C. to 145° C., in a temperature raising process 2, is 1.50° C. or higher in differential scanning calorimetry (DSC) measurement when the temperature raising process 1 of continuously raising the temperature from 30° C. to 200° C. at a temperature change rate of 5° C./min in a nitrogen atmosphere, and the temperature raising process 2 of lowering the temperature from 200° C. to 30° C. and raising the temperature from 30° C. to 200° C., are performed.

When the difference in temperature of the endothermic peaks is 1.50° C. or higher, the permeability of the electrolytic solution into the porous substrate is preferable. The difference in temperature between the endothermic peaks is preferably 1.60° C. or higher, and more preferably 1.70° C. or higher. The upper limit of the difference in temperature of the endothermic peaks is preferably 15° C. or lower, more preferably 10° C. or lower, and still more preferably 5° C. or lower from the viewpoint of heat resistance and thermal shrinkage.

The temperature raising process 1 is a first heat-up to be applied to the porous substrate in the DSC measurement, and the state of crystals in the porous substrate is released to form the spherulites.

The temperature raising process 2 is a temperature raising process of lowering the temperature after the temperature raising process 1 and giving the porous substrate again.

The endothermic peak observed at from 120° C. to 145° C. means a peak derived from polyethylene.

Examples of the method of controlling a temperature of an endothermic peak of a porous substrate in the DSC include changing stretching conditions (for example, uni-axial stretching, biaxial stretching, sequential biaxial stretching, and simultaneous biaxial stretching), heat treatment conditions, and the like for polyethylene, and the like. For example, the sequential biaxial stretching and the simultaneous biaxial stretching are preferable in that the difference in temperature between the endothermic peaks can be increased.

In the present disclosure, by selecting a porous substrate having the temperature in difference between the endothermic peaks of 1.50° C. or higher in the DSC measurement, or by using the porous substrate prepared by performing the physical treatment on the porous substrate in which the temperature in difference between the endothermic peaks in the DSC measurement is 1.50° C. or higher, it is possible to obtain the separator for a non-aqueous secondary battery into which an electrolytic solution easily permeates.

The DSC measurement may be performed on the porous substrate on which the layer such as the porous layer is not provided, or may be performed on the porous substrate after the porous layer or the like of the porous substrate on which the layer such as the porous layer is provided is removed.

Examples of the method of removing the layer on the porous substrate include a method in which a separator is washed with a good solvent of a resin. In this case, the operation of washing the separator with the good solvent of the resin, drying the separator, and measuring a weight is repeated a plurality of times, and the time point when the change in the weight of the separator disappears can be regarded as the time point when the removal of the layer is completed.

It can be confirmed that the difference in temperature between the endothermic peaks in the DSC measurement is 1.50° C. or higher by the following method.

The porous substrate not provided with the porous layer is cut out so as to be 5 mg±1 mg, and the measurement is performed using the differential scanning calorimeter. As the differential scanning calorimeter, for example, the measurement can be performed using Q20 manufactured by TA Instruments. Specifically, the DSC measurement is performed by raising the temperature from 30° C. to 200° C. at a temperature raising rate of 5° C./min (temperature raising process 1) in the nitrogen atmosphere, lowering the temperature to 30° C. at 5° C./min, and further raising the temperature to 200° C. at 5° C./min (temperature raising process 2). The first and second measurements are performed continuously, and the measurement is performed without providing a pause time between the temperature rise and the temperature drop. Then, the temperature of the endothermic peak (top peak) between 120° C. and 145° C., is determined from the DSC chart obtained by the measurement. The difference between the temperature of the endothermic peak (top peak) of the first time at from 120° C. to 145° C. and the temperature of the endothermic peak (top peak) of the second time at from 120° C. to 145° C., is calculated.

As the porous substrate, an aspect in which a microporous film containing polyethylene (in the present specification, the polyethylene microporous film is referred to as a "polyethylene microporous film") is used is preferable. The polyethylene microporous film can be selected from the polyethylene microporous films applied to the conventional separators for non-aqueous secondary batteries, and the polyethylene microporous film having preferable mechanical properties and ion permeability are preferable.

The porous substrate may be a substrate made of the polyethylene microporous film from the viewpoint of the mechanical properties and shutdown characteristics.

As the porous substrate, a microporous film containing polyethylene and polyolefin other than polyethylene can also be used. The microporous film containing polyethylene and polyolefin other than the polyethylene is preferably a film in which the content of polyethylene in the resin component in the film is 95% by mass or more. The microporous film containing polyethylene and a polyolefin other than the polyethylene may be, for example, a microporous film containing polyethylene and polypropylene, or a microporous film containing polyethylene and polypropylene at a ratio of 95:5 (=polyethylene: polypropylene [mass ratio]).

When a microporous film containing, for example, polyethylene and polypropylene is used as the porous substrate, the difference in temperature between the endothermic peaks in the DSC measurement can be determined by determining the temperature of the endothermic peak derived from polyethylene, that is, an endothermic peak (top peak) between 120° C. and 145° C., in the DSC chart obtained by the DSC measurement. The same applies to a microporous film containing a combination of two types other than a combination of polyethylene and polypropylene.

The polyethylene contained in the polyethylene microporous film preferably has a weight-average molecular weight in the range of from 100,000 to 5,000,000. When the weight-average molecular weight is 100,000 or more, preferable mechanical properties can be secured. On the other hand, when the weight-average molecular weight is 5,000,000 or less, it is easy to form a film.

The polyethylene microporous film can be produced, for example, by the following method. That is, the method is a method of producing a microporous film by extruding a molten polyethylene resin from a T-die to form a sheet, performing a crystallization treatment on the sheet and then stretching the sheet, and performing a heat treatment on the sheet, or a method of producing a microporous member by extruding a polyethylene resin melted together with a plasticizer such as liquid paraffin from a T-die into a sheet shape, cooling and stretching the extruded resin, and then extracting a plasticizer and performing a heat treatment.

The average pore size of the porous substrate is preferably in a range of from 20 nm to 100 nm. When the average pore size of the porous substrate is 20 nm or more, ions are likely to move, and preferable battery performance is likely to be obtained. From such a viewpoint, the average pore size of the porous substrate is more preferably 30 nm or more, and still more preferably 40 nm or more. On the other hand, when the average pore size of the porous substrate is 100 nm or less, the peel strength between the porous substrate and the porous layer is improved. From such a viewpoint, the average pore size of the porous substrate is more preferably 90 nm or less, and still more preferably 80 nm or less.

Note that the average pore size of the porous substrate is a value measured using a palm porometer, and can be measured using a palm porometer (CFP-1500-A manufactured by PMI) in accordance with ASTM E1294-89, for example.

The thickness of the porous substrate is preferably in a range of from 3 μm to 25 μm from the viewpoint of obtaining preferable mechanical properties and internal resistance. In particular, the thickness of the porous substrate is more preferably in the range of from 5 μm to 20 μm.

The Gurley value (JIS P8117:2009) of the porous substrate is preferably in the range of from 50 seconds/100 ml to 400 seconds/100 ml from the viewpoint of obtaining the ion permeability:

The porosity of the porous substrate is preferably in a range of from 20% to 60% from the viewpoint of obtaining an appropriate film resistance.

The puncture strength of the porous substrate is preferably 200 g or more from the viewpoint of improving the production yield.

The porous substrate is preferably subjected to various surface treatments. By performing the surface treatment, wettability with a coating liquid for forming the porous layer described later can be improved. Specific examples of the surface treatment include a corona treatment, a plasma treatment, a flame treatment, an ultraviolet irradiation treatment, and the like, and the treatment can be performed in the range in which the characteristics of the porous substrate are not impaired.

(Porous Layer)

The porous layer in the present disclosure contains a resin (hereinafter, also referred to as a specific resin) having at least one bonding group selected from the group consisting of an amide bond, an imide bond, and a sulfonyl bond only on one side of the porous substrate. The porous layer in the present disclosure preferably contains inorganic particles, and may further contain other components such as resins other than the specific resin and additives as necessary.

The porous layer has a structure in which a plurality of pores are provided inside the layer and the plurality of pores are connected to each other, and is configured to pass a gas or a liquid from one side to the other side of the layer.

-Resin

The porous layer contains at least one type of resin (specific resin) having at least one bonding group selected from the group consisting of the amide bond, the imide bond, and the sulfonyl bond. Since the resin has the bonding group selected from the amide bond, the imide bond, and the sulfonyl bond, the affinity for the porous substrate (in particular, a polyethylene film) is improved, and the affinity with the electrolytic solution is also high, so permeability of the electrolytic solution into the porous layer is improved. As a result, in the separator for a non-aqueous secondary battery of the present disclosure, the permeation of the electrolytic solution easily proceeds rapidly, and the separator that is well impregnated with the electrolytic solution is easily obtained. As a result, this contributes to improvement of battery characteristics when the secondary battery is produced.

The specific resin in the present disclosure is a polymer having at least one bonding group selected from the group consisting of the amide bond, the imide bond, and the sulfonyl bond, and may have any structure as long as it is a polymer having the above bonding group. Note that each of the resins in the present disclosure may be contained singly or in combination of two or more kinds thereof.

Examples of the resin having the amide bond include nylon, wholly aromatic polyamide, polyamideimide, and the like.

Examples of the resin having the imide bond include polyamideimide, polyimide, and the like.

Examples of the resin having a sulfonyl bond include polysulfone, polyethersulfone, and the like.

Among the specific resins, the wholly aromatic polyamides are preferable from the viewpoint of having good affinity for a porous substrate (particularly, a polyethylene film) and an electrolytic solution, and also from the viewpoint of having excellent heat resistance. The wholly aromatic polyamide can be dissolved in a polar organic solvent represented by an amide-based solvent at an appropriate concentration. Therefore, a solution (coating liquid) in which the wholly aromatic polyamide is dissolved in an organic solvent is applied onto a porous substrate including a polyethylene microporous film, and the coating film is solidified, washed with water, and dried, so the porous layer can be easily formed. In addition, it is easy to control the porous structure. Furthermore, since the coating liquid easily enters the pores of the porous substrate, the electrolytic solution impregnation property of the porous substrate can also be enhanced.

In addition, since the melting point of the wholly aromatic polyamide is 200° C. or higher, the heat resistance of the separator is enhanced, and the safety of the secondary battery is improved.

The wholly aromatic polyamide includes meta-polyamide (in the present specification, also referred to as meta-aramid) and para-polyamide. Among these, the meta-polyamide is more suitable than the para-polyamide in that the porous layer is easily formed from the viewpoint of crystallinity:

Examples of the meta-polyamide include polymethaphenylene isophthalamide and the like. In addition, examples of the para-polyamide include copolyparaphenylene 3.4'oxy dipheny lene terephthalamide, polyparapheny lene terephthalamide, and the like.

As the wholly aromatic polyamide, a commercially available product on the market may be used. Examples of commercially available products include CONEX (registered trademark: meta type) manufactured by TEIJIN CORPORATION, TECHNORA (registered trademark: para-type), Twaron (registered trademark: para type), and the like.

The content of the resin (preferably the wholly aromatic polyamide) in the porous layer is preferably 10% by mass to 40% by mass, and more preferably 15% by mass to 35% by mass with respect to the total solid content of the porous layer.

-Particles

The porous layer preferably contains particles, and the particles include both inorganic particles and organic particles. The porous layer preferably contains inorganic particles. Note that the particles in the porous layer may be contained singly or in mixture of two or more kinds thereof.

Inorganic particles contained in the porous layer can improve heat resistance, reduce film resistance (improvement in easiness of impregnation of electrolytic solution and easiness of formation of pores), and reduce a friction coefficient.

Examples of the inorganic particles include metal oxides such as alumina, zirconia, yttria, ceria, magnesia, titania, and silica: metal nitrides such as boron nitride and aluminum nitride: metal salts such as calcium carbonate and barium sulfate: metal hydroxides such as magnesium hydroxide; and the like.

Among these, as the inorganic particles, divalent metal-containing particles are preferable, and divalent metal sulfate particles or divalent metal hydroxide particles are more preferably from the viewpoint of improving the heat resistance, reducing the film resistance (improvement in easiness of impregnation of electrolytic solution and easiness of formation of pores), and reducing the friction coefficient. For example, magnesium-containing particles or barium-containing particles are preferred.

As the magnesium-containing particles, particles of magnesium sulfate, magnesium hydroxide, magnesium oxide, and the like are preferable, and particles of magnesium hydroxide are more preferable.

As the barium-containing particles, particles of barium sulfate are preferable.

The average primary particle diameter of the inorganic particles is preferably from 0.01 μm to 2.0 μm. When the average primary particle diameter is 0.01 μm or more, a porous structure is easily formed during the manufacturing the separator. In addition, when the average primary particle diameter is 2.0 μm or less, it is advantageous for thinning the porous layer, and the packing density of the inorganic particles and the resin in the heat-resistant porous layer is increased.

The average primary particle diameter of the inorganic particles is more preferably from 0.02 μm to 1.5 μm, and still more preferably from 0.03 μm to 0.9 μm.

The average primary particle diameter is obtained by measuring major diameters of 100 inorganic particles randomly selected in observation with a scanning electron microscope (SEM), and averaging the major diameters of 100 inorganic particles. The sample to be subjected to the observation of the SEM is inorganic particles as a material of the heat-resistant porous layer or inorganic particles taken out from the separator. The method of taking out the inorganic particles from the separator is not limited, and examples thereof include a method in which the separator is heated to about 800° C. to remove the binder resin and take out the inorganic particles, and a method in which the separator is immersed in an organic solvent to dissolve the binder resin with the organic solvent and take out the inorganic particles.

When the average primary particle diameter of the inorganic particles is small, or when the aggregation of the inorganic particles is remarkable and the major axis of the inorganic particles cannot be measured, the specific surface area of the inorganic particles is measured by the BET method, and assuming that the inorganic particles are true spheres, the particle diameter is calculated from the specific gravity and the specific surface area of the inorganic particles according to the following formula.

Average primary particle diameter (μm)=6÷ [specific gravity (g/cm$^3$)× BET specific surface area (m$^2$/g)]

Note that in the measurement of the specific surface area by the BET method, an inert gas is used as an adsorbent, and the surface of the inorganic particles is adsorbed at a boiling point temperature (−196° C.) of liquid nitrogen. The amount of gas adsorbed to the sample is measured as a function of the pressure of the adsorbent, and the specific surface area of the sample is determined from the adsorption amount.

The shape of the inorganic particles is not limited, and may be a sphere, a shape close to a sphere, a plate shape, or a fibrous shape.

Other Components

The porous layer in the present disclosure can contain other components such as resins other than the specific resin and additives as necessary, in addition to the above components. Any of the other components can be used singly or in mixture of two or more kinds thereof.

The resin other than the specific resin may be appropriately selected from any known resins according to the purpose or the case as long as the effect of the present disclosure is not significantly impaired.

Examples of the additive include a dispersant such as a surfactant, a wetting agent, an antifoaming agent, a pH adjusting agent, and the like.

The porous layer can be formed by preparing a coating liquid for forming the porous layer and applying the coating liquid to the porous substrate. The coating can be performed by a coating method of a method of pressing a roll or the like against the porous substrate for coating, such as a method using a reverse coater, from the viewpoint of adjusting the contact angle to the above range.

-Characteristics of Porous Layer

[Thickness]

The thickness of the porous layer provided on one side of the porous substrate is preferably from 0.3 μm to 5.0 μm. When the thickness of the porous layer is 0.3 μm or more, a smooth and homogeneous layer is obtained, and the cycle characteristics of the battery are further improved. From the same viewpoint, the thickness of one side of the porous layer is more preferably 1.5 μm or more.

On the other hand, when the thickness of one side of the porous layer is 5.0 μm or less, the ion permeability is further improved, and the load characteristics of the battery are more excellent. From the same viewpoint, the thickness of one side of the porous layer is more preferably 4.0 μm or less, still more preferably 3.0 μm or less, and particularly preferably 2.5 μm or less.

[Porosity]

The porosity of the porous layer is preferably in a range of from 30% to 80%. When the porosity is 80% or less, it is easy to secure mechanical properties, the surface opening ratio does not become too high, and it is suitable for securing adhesive force. On the other hand, when the porosity is 30% or more, the ion permeability is further improved.

The porosity(s) is a value obtained from the following formula.

$$\varepsilon=\{1-Ws/(ds \cdot t)\}\times 100$$

In the formula, ε represents porosity (%), Ws represents basis weight (g/m$^2$), ds represents true density (g/cm$^3$), and t represents film thickness (μm).

[Average Pore Size]

The average pore size of the porous layer is preferably in a range of from 10 nm to 300 nm. When the average pore size is 300 nm or less, nonuniformity of pores is suppressed, adhesion points are relatively uniformly scattered, and adhesiveness is further improved. In addition, when the average pore size is 300 nm or less, uniformity of movement of ions is high, and cycle characteristics and load characteristics are further improved. On the other hand, if the average pore size is 10 nm or more, when the porous layer is impregnated with the electrolytic solution, the phenomenon that the resin constituting the porous layer swells and closes the pores, so that ion permeability is hindered is unlikely to occur.

The average pore size (diameter, unit: nm) of the porous layer is calculated from the following formula using the pore surface area S of the porous layer composed of the wholly aromatic polyamide calculated from the nitrogen gas adsorption amount and the pore volume V of the porous layer calculated from the porosity, assuming that all pores are cylindrical.

$$d=4 \cdot V/S$$

In the formula, d represents an average pore size (nm) of the porous layer, V represents a pore volume per 1 m$^2$ of the porous layer, and S represents a pore surface area per 1 m$^2$ of the porous layer.

In addition, the pore surface area S per 1 m$^2$ of the porous layer is determined by the following method.

The specific surface area (m$^2$/g) of the porous substrate and the specific surface area (m$^2$/g) of the composite film obtained by laminating the porous substrate and the porous layer are measured by applying the BET equation by a nitrogen gas adsorption method. Each specific surface area is multiplied by each basis weight (g/m$^2$) to calculate each pore surface area per 1 m$^2$. Subsequently, the pore surface area per 1 m$^2$ of the porous substrate is subtracted from the pore surface area per 1 m$^2$ of the separator to calculate the pore surface area S per 1 m$^2$ of the porous layer.
-Characteristics of Separator
[Macmillan Number (Mn)]

From the viewpoint of ion permeability, the separator for a non-aqueous secondary battery of the present disclosure preferably has a Macmillan number (Mn) of 20 or less, which is obtained by the following formula.

The Macmillan number is an index of ion permeability, and is a value obtained by dividing the conductivity of only the electrolytic solution by the conductivity when the separator is impregnated with the electrolytic solution. That is, when Mn is too large, the ion permeability becomes insufficient.

Mn is more preferably 15 or less, still more preferably 12 or less, and still more preferably 10 or less. The lower limit value of Mn can be 1 or more, and is preferably 4 or more.

$$Mn=(\sigma e)/(\sigma s)$$

$$\sigma s=t/Rm$$

$\sigma e$ represents a conductivity (S/m) of an electrolytic solution at 20° C., in which 1 mol/l of LiPF$_6$ is dissolved in a mixed solvent of ethylene carbonate and propylene carbonate (mixing ratio 1:1 [mass ratio]). $\sigma e$ is a value measured by an electric conductivity meter CM-41X and an electric conductivity cell CT-5810B manufactured by DKK-TOA CORPORATION.

$\sigma s$ represents a conductivity (S/m) of the separator impregnated with the electrolytic solution at 20° C. $\sigma s$ is a value measured by dividing the film thickness by the film resistance.

$t$ represents a film thickness (m). The film thickness is a value obtained by a method similar to the following [thickness].

Rm represents the film resistance (ohm·cm$^2$) of the separator. Rm is a value obtained by a method similar to the following "[Film resistance (ion permeability)]".
[Thickness]

The separator for a non-aqueous secondary battery of the present disclosure preferably has a thickness of from 7.5 μm to 20 μm.

When the thickness of the separator is 7.5 μm or more, it is easy to maintain sufficient strength capable of handling the separator. In addition, when the thickness of the separator is 20 μm or less, the ion permeability can be favorably maintained, the dischargeability and low-temperature characteristics of the battery can be easily maintained, and the energy density of the battery can be favorably maintained.

Among them, the thickness of the separator is more preferably 7.6 μm to 14 μm for the same reason.

The thickness is a value measured with a cylindrical measurement terminal having a diameter of 5 mm using a contact type thickness meter (LITEMATIC manufactured by Mitutoyo Corporation). During the measurement, a load of 0.01N is adjusted to be applied, arbitrary 20 points within 10 cm×10 cm are measured, and an average value thereof is calculated.
[Film Resistance (Ion Permeability)]

The film resistance of the separator is preferably in the range of from 1 ohm·cm$^2$ to 10 ohm·cm$^2$ from the viewpoint of securing the load characteristics of the battery.

The film resistance refers to a resistance value in a state where the separator is impregnated with an electrolytic solution, and is a value measured by an alternating current method. The film resistance is measured at 20° C. using the electrolytic solution in which 1 mol/l of LiPF$_6$ is dissolved in a mixed solvent of ethylene carbonate and propylene carbonate (mixing ratio 1:1 [mass ratio]). A detailed measurement method will be described in Examples.

It is preferable that in the porous substrate, a resin is provided inside a pore of the porous substrate and on a surface of the porous substrate on a side opposite to a side having the porous layer. As a result, the entire separator can be impregnated with the electrolytic Solution The phrase "resin is provided inside a pore of the porous substrate" refers to a state in which a part or all of the inside of the pores of the porous substrate is impregnated with the resin.

The phrase "resin is provided on a surface of the porous substrate on a side opposite to a side having the porous layer" refers to a state in which, when a coating liquid for forming a porous layer is applied to one side of the porous substrate, the resin in the coating liquid penetrates from one side of the porous substrate and passes through the inside of pores in the porous substrate, and the resin reaches the other side, so the presence of the resin can be confirmed. The presence of the resin can be determined by the fact that the contact angle after applying the coating liquid for forming the porous layer is lower than the contact angle of the surface of the porous substrate before applying the coating liquid for forming the porous layer.

Whether or not the resin adheres to the inner surfaces of the pores of the porous substrate can be confirmed by energy dispersive X-ray spectroscopy (Energy Dispersive X-ray Spectroscopy (SEM-EDX)), secondary ion mass spectrometry (Secondary Ion Mass Spectrometry (SIMS)), or X-ray photoelectron spectroscopy (Electron Spectroscopy for Chemical Analysis (ESCA)), observation by staining a resin, and the like.
<Non-aqueous Secondary Battery>

The non-aqueous secondary battery according to the present disclosure includes: a positive electrode: a negative electrode: the separator for a non-aqueous secondary battery described above disposed between the positive electrode and the negative electrode; and an electrolytic solution in which a lithium salt is dissolved in a solvent containing a cyclic carbonate in an amount of 90% by mass or more based on a total mass of the solvent, in which an electromotive force is obtained by doping and dedoping lithium.

The dope means occlusion, support, adsorption, or insertion, and means a phenomenon in which lithium ions enter an active material of an electrode such as a positive electrode.

The non-aqueous secondary battery according to the present disclosure is preferably a lithium ion secondary battery having a structure in which a separator is disposed between a positive electrode and a negative electrode, and includes (1) a secondary battery in which battery elements such as a positive electrode, a negative electrode, and a separator are enclosed in an exterior material together with an electrolytic solution, and (2) an all-resin battery in which a resin is used for all battery elements including an electrode.

For the secondary battery of the above (1), the material described in paragraphs from 0056 to 0061 of WO 2008/062727 A and the like can be referred to.

The all-resin battery of the above (2) is a secondary battery in which an electrode active material covered with a gel-like polymer that has absorbed an electrolytic solution, a conductive auxiliary agent, conductive fibers, and the like are mixed to form a mixture, a mixture for the positive electrode and a mixture for the negative electrode are stacked with a separator interposed therebetween, and a current collector is more preferably provided on surfaces of the mixtures.

The positive electrode may be a positive electrode layer obtained by molding a mixture obtained by mixing a positive electrode active material, a gel-like electrolyte covering the positive electrode active material, and a conductive fiber. The positive electrode layer may further contain a conductive auxiliary agent.

The negative electrode may be a negative electrode layer obtained by molding a mixture obtained by mixing a negative electrode active material, a gel-like electrolyte covering the negative electrode active material, and a conductive fiber. The negative electrode layer may further contain a conductive auxiliary agent.

Examples of the positive electrode active material include lithium-containing transition metal oxides or the like, and examples thereof include $LiCoO_2$, $LiNiO_2$, $LiMn_{1/2}Ni_{1/2O2}$, $LiCo_{1/3}Mn_{1/3}Ni_{1/3}O_2$, $LiMn_{2O4}$, $LiFePO_4$, $LiCo_{1/2}Ni_{1/2}O_2$, $LiAl_{1/4}Ni_{3/4}O_2$, and the like.

Examples of the negative electrode active material include hard carbon (non-graphitizable carbon).

Examples of the gel-like electrolyte include a gel-like polymer (polymer gel) in which an electrolytic solution is absorbed.

The electrolytic solution is a solution in which a lithium salt is dissolved in a non-aqueous solvent.

Examples of the lithium salt include $LiPF_6$, $LiBF_4$, $LiClO_4$, and the like.

Examples of the non-aqueous solvent include propylene carbonate (PC), ethylene carbonate (EC), dimethyl carbonate, diethyl carbonate, ethyl methyl carbonate, γ-butyrolactone, and the like. The non-aqueous solvent may be used singly or in mixture of two or more kinds thereof. As the non-aqueous solvent, a non-aqueous solvent having a high relative permittivity and a low melting point is preferable, a cyclic carbonate is more preferable, and a mixed solvent containing a cyclic carbonate in an amount of 90% by mass or more with respect to the total mass of the non-aqueous solvent is more preferable.

The cyclic carbonate-based non-aqueous solvent such as EC and PC is a solvent having a relatively high viscosity.

An electrolytic solution containing a cyclic carbonate-based non-aqueous solvent such as EC and PC is preferable from the viewpoint of easily retaining a large amount of electrolyte and excellent electrochemical stability. Conventionally, when the electrolytic solution does not necessarily have sufficient permeability into the separator, the electrolytic solution to be impregnated becomes insufficient, and therefore a high-concentration electrolytic solution containing a large amount of electrolyte is generally used after being diluted. In this respect, since the non-aqueous secondary battery of the present disclosure includes the separator for a non-aqueous secondary battery of the present disclosure having excellent electrolyte permeability as described above, a cyclic carbonate having a relatively high viscosity can be used as the solvent. In addition, a high-concentration electrolytic solution using a cyclic carbonate can be used for the non-aqueous secondary battery, and the impregnation property of the electrolytic solution is excellent, so the battery characteristics are excellent.

EXAMPLES

Hereinafter, the present invention will be described more specifically with reference to examples, but the present invention is not limited to the following examples unless it goes beyond the gist of the present invention. Note that unless otherwise specified, "parts" are on a mass basis.
(Measurement)

A porous substrate and a separator produced in Examples and Comparative Examples described later were subjected to the following measurement.
[Film Thickness]

The thicknesses (μm) of the porous substrate and the separator were determined by measuring 20 points with a contact type thickness meter (Mitutoyo Corporation, LITEMATIC VL-50) and averaging the measured values. The measurement terminal used was a cylindrical terminal with a diameter of 5 mm, and was adjusted so that a load of 0.01 N was applied during the measurement.
[Film Thickness of Porous Layer]

The difference between the thickness of the separator and the thickness of the porous substrate was defined as the film thickness of the porous layer.
[Film Resistance]

The produced separator is cut into a sample piece having a size of 2.6 cm×2.0 cm. An aluminum foil having a thickness of 20 μm is cut into a size of 2.0 cm×1.4 cm, and a lead tab is attached thereto. Two aluminum foils are prepared, and the cut sample piece is sandwiched between the aluminum foils so that the aluminum foil is not short-circuited. The sample piece is impregnated with an electrolytic solution in which 1 mol/l of $LiPF_6$ is dissolved in a mixed solvent of ethylene carbonate and propylene carbonate (mixing ratio 1:1 [mass ratio]) as an electrolytic solution. This is sealed in an aluminum laminate pack under reduced pressure so that the tab comes out of the aluminum pack to form a cell. Such cells are prepared so that one, two, and three sample pieces (separators) are provided in an aluminum foil. This cell is placed in a thermostatic bath at 20° C., and the resistance of the cell is measured at an amplitude of 10 mV and a frequency of 100 kHz by an AC impedance method. The measured resistance value of the cell is plotted with respect to the number of separators, and the plot is linearly approximated to obtain a gradient. The gradient was multiplied by the electrode area of 2.0 cm×1.4 cm to determine the film resistance (ohm·cm²) per separator.
[Macmillan Number (Mn)]

The Macmillan number (Mn) was calculated from the following formula.

$$Mn = (σe)/(σs)$$

$$σs = t/Rm$$

In the formula, σe represents a conductivity (S/m) of an electrolytic solution at 20° C. obtained by dissolving 1 mol/l of $LiPF_6$ in a mixed solvent (mixing ratio 1:1 [mass ratio])

of ethylene carbonate and propylene carbonate, σe represents a conductivity (S/m) of the separator impregnated with the electrolytic solution at 20° C., t represents a film thickness (m), and Rm represents a film resistance (ohm·cm²) of the separator. σe was measured by an electric conductivity meter CM-41X and an electric conductivity cell CT-58101B manufactured by DKK-TOA CORPORATION, and σs was measured by dividing the film thickness by the film resistance. τ and Rm were measured in the same manner as in the above [Film thickness of porous layer] and [Film resistance], respectively.

[DSC Measurement]

The porous substrate before coating was cut out so as to be 5 mg+1 mg, and the DSC measurement was performed using a differential scanning calorimeter (manufactured by TA Instruments, Q20).

The DSC measurement was performed by raising the temperature from 30° C. to 200° C. at a temperature raising rate of 5° C./min in a nitrogen atmosphere (temperature raising process 1), then lowering the temperature to 30° C. at 5° C./min, and further raising the temperature to 200° C. at 5° C./min (temperature raising process 2). The first measurement and the second measurement were continuously performed, and the measurement was performed without providing a pause time between the temperature rise and the temperature drop. Then, the temperature of the endothermic peak (top peak) at from 120° C. to 145° C. was obtained from the obtained DSC chart. The difference between the top peak temperatures at from 120° C. to 145° C. (difference in temperature between endothermic peaks) was calculated from the DSC chart of the first temperature increase and the DSC chart of the second temperature increase.

[Test Production of Non-Aqueous Secondary Battery]

lithium cobalt oxide (LiCoO₂: manufactured by Nippon Chemical Industrial Co., Ltd.) powder, acetylene black (manufactured by Denki Kagaku Kogyo Co., Ltd.: trade name Denka Black), and polyvinylidene fluoride (manufactured by Kureha Chemical Co., Ltd.) are kneaded using a N-methyl-2 pyrrolidone solvent so that the lithium cobalt oxide powder is 94 parts by mass, acetylene black is 3 parts by mass, and polyvinylidene fluoride is 3 parts by mass, thereby preparing a slurry. The obtained slurry was applied onto an aluminum foil having a thickness of 20 μm, dried, and then pressed to obtain a positive electrode having a thickness of 100 μm.

Hard carbon (Belfine LN-0001: AT Electrode) powder, acetylene black (manufactured by Denki Kagaku Kogyo Co., Ltd.: trade name Denka Black), and polyvinylidene fluoride (manufactured by Kureha Chemical Co., Ltd.) are kneaded using a N-methyl-2 pyrrolidone solvent so that the hard carbon powder is 87 parts by mass, the acetylene black is 3 parts by mass, and the polyvinylidene fluoride is 10 parts by mass, thereby preparing a slurry. The obtained slurry was applied onto a copper foil having a thickness of 18 μm, dried, and then pressed to obtain a negative electrode having a thickness of 90 μm.

The positive electrode and the negative electrode were opposed to each other with a separator interposed therebetween. This was impregnated with an electrolytic solution and sealed in an exterior made of an aluminum laminate film to prepare a non-aqueous secondary battery: Here, as the electrolytic solution, a solution obtained by dissolving 1 mol/l of LiPF₆ in a mixed solvent of ethylene carbonate and propylene carbonate (mixing ratio 1:1 [mass ratio]) was used as it was.

Here, this prototype battery has a positive electrode area of 5.0× 3.0 cm², a negative electrode area of 5.2× 3.2 cm², and a set capacity of 10 mAh (range of from 4.2 V to 2.5 V).

(Evaluation)

[Dischargeability]

Dischargeability evaluation was performed using the battery produced by the method as described above. A charge/discharge cycle of constant current/constant voltage charge at 1 mA and 4.2 V for 15 hours and constant current discharge at 1 mA and 2.5 V was performed for 5 cycles, and a discharge capacity obtained at a second cycle was divided by a discharge capacity of a battery at a fifth cycle, the obtained numerical value was used as an index of the dischargeability, and evaluation was performed according to the following evaluation criteria.

<Evaluation criteria >

A: 85% or more

B: 70% or more but less than 85%

C: less than 70%

[Heat Resistance]

The produced separator is cut out by 18 cm (machine direction (MD))×6 cm (transverse direction (TD)). Locations (point A and point B) of 2 cm and 17 cm from the top are marked on a line that divides TD into two equal parts. Further, marks are made at locations (point C and point D) of 1 cm and 5 cm from the left on a line that divides MD into two equal parts. A clip is attached thereto (the location where the clip is attached is within 2 cm from the upper portion of the MD), hung in an oven adjusted to 120° C., and heat-treated for 60 minutes under no tension. Lengths between the two points AB and CD were measured before and after the heat treatment, and the thermal shrinkage ratio was obtained from the following formula.

MD thermal shrinkage ratio (%)={(length of AB before heat treatment-length of AB after heat treatment)/length of AB before heat treatment}× 100

TD thermal shrinkage ratio (%)={(length of CD before heat treatment-length of CD after heat treatment)/length of CD before heat treatment}× 100

<Evaluation Criteria>

A: MD thermal shrinkage ratio and TD thermal shrinkage ratio are both less than 5%.

B: Either MD thermal shrinkage or TD thermal shrinkage is 5% or more.

Example 1

Meta-wholly aromatic polyamide (meta-aramid) was dissolved in dimethylacetamide (DMAc) so as to have a concentration of 4.5% by mass, and barium sulfate particles (average primary particle diameter: 0.05 μm) were further mixed while stirring to obtain a coating liquid A. Subsequently, the coating liquid A was applied to one side of a polyethylene microporous film A (thickness: 7 μm) with a reverse roll coater to form a coating film. A difference in temperature between endothermic peaks of the polyethylene microporous film A measured by DSC was 1.77° C.

Then, the coating film was immersed in a coagulation liquid (DMAc:water=50:50 [mass ratio], liquid temperature 40° C.) to solidify a coating layer. Next, the coating layer was washed in a water washing tank having a water temperature of 40° C. and dried. As a result of evaluation, a ratio of meta-aramid: barium sulfate in a porous layer was 20:80 (mass ratio). In this way, a separator in which a porous layer having a thickness of 2.2 μm was formed on one side of a polyethylene microporous film was prepared.

Example 2

A separator was produced in the same manner as in Example 1, except that the barium sulfate particles were changed to magnesium hydroxide particles (average primary particle diameter: 0.88 μm) in Example 1.

Example 3

In Example 1, a separator was prepared in a manner similar to Example 1 except that the polyethylene microporous film A was changed to a polyethylene microporous film B (thickness 7 μm, and temperature in difference between endothermic peaks by DSC measurement: 3.53° C.).

Example 4

In Example 1, a separator was prepared in a manner similar to Example 1 except that the polyethylene microporous film A was changed to a polyethylene microporous film C (thickness 7 μm, and temperature in difference between endothermic peaks by DSC measurement: 2.57° C.).

Example 5

In Example 1, a separator was prepared in the same manner as in Example 1 except that the coating liquid was prepared without adding barium sulfate particles, and a separator having a porous layer having a film thickness of 0.6 μm formed on one side of the polyethylene microporous film was prepared.

Comparative Example 1

In Example 1, a separator was prepared in the same manner as in Example 1 except that the coating liquid A was applied to both sides of the polyethylene microporous film A to form a coating film on the front and back of the polyethylene microporous film A.

Comparative Example 2

A polyvinylidene fluoride type resin (VDF-HFP copolymer, VDF:HFP (molar ratio)=97.6:2.4, weight-average molecular weight 1,130,000) was dissolved in a mixed solvent (DMAc:TPG=80:20 [mass ratio]) of dimethylacetamide (DMAc) and tripropylene glycol (TPG) so as to have a concentration of 4% by mass, and barium sulfate particles (average primary particle diameter: 0.05 μm) were further stirred and mixed to obtain a coating liquid P.

The coating liquid P was applied to one side of the polyethylene microporous film B with a reverse roll coater to form a coating film. The coating film was immersed in a coagulation liquid (DMAc:TPG:water=30:8:62 [mass ratio], liquid temperature 40° C.) to solidify the coating film. Subsequently, the coating film was washed with a water washing tank having a water temperature of 40° C. and dried. In this way, the separator in which a porous layer was formed on one side of the polyethylene microporous film was obtained.

Comparative Example 3

In example 1, a separator was prepared in a manner similar to Example 1 except that the polyethylene microporous film A was changed to a polyethylene microporous film D (thickness 7 μm, and temperature in difference between endothermic peaks by DSC measurement: 1.25° C.).

Comparative Example 4

In example 1, a separator was prepared in a manner similar to Example 1 except that the polyethylene microporous film A was changed to a polyethylene microporous film E (thickness 10.4 μm, and temperature in difference between endothermic peaks by DSC measurement: 1.45° C.).

Comparative Example 5

In example 1, a separator was prepared in a manner similar to Example 1 except that the polyethylene microporous film A was changed to a polyethylene microporous film F (thickness 7 μm, and temperature in difference between endothermic peaks by DSC measurement: 0.89° C.).

TABLE 1

| | Separator | | | | | | | | | | |
| | | | | | | | Porous layer | | | | |
| | | | DSC temperature difference [° C.]*1 | Porous substrate | Coating surface | Resin | Inorganic particle | Film thickness of porous layer [μm] | Measurement and evaluation | | |
| | Film thickness [μm] | Film resistance [Ω · cm²] | | | | | | | Macmillan number | Discharge ability | Heat resistance |
|---|---|---|---|---|---|---|---|---|---|---|---|
| Example 1 | 9.2 | 1.53 | 1.77 | A | One side | Meta-aramid | BaSO₄ | 2.2 | 9.0 | A | A |
| Example 2 | 8.8 | 1.45 | 1.77 | A | One side | Meta-aramid | Mg(OH)₂ | 1.8 | 8.9 | A | A |
| Example 3 | 9.2 | 1.51 | 3.53 | B | One side | Meta-aramid | BaSO₄ | 2.2 | 8.9 | A | A |
| Example 4 | 9.1 | 1.52 | 2.57 | C | One side | Meta-aramid | BaSO₄ | 2.1 | 9.1 | A | A |
| Example 5 | 7.6 | 1.43 | 1.77 | A | One side | Meta-aramid | None | 0.6 | 10.2 | A | B |
| Comparative Example 1 | 12.8 | 1.78 | 1.77 | A | Both sides | Meta-aramid | BaSO₄ | 5.8 | 7.6 | B | A |
| Comparative Example 2 | 9.0 | 1.80 | 1.77 | A | One side | PVDF | BaSO₄ | 2.0 | 10.9 | C | B |
| Comparative Example 3 | 9.0 | 2.74 | 1.25 | D | One side | Meta-aramid | BaSO₄ | 2.0 | 16.6 | B | A |
| Comparative Example 4 | 12.4 | 2.45 | 1.45 | E | One side | Meta-aramid | BaSO₄ | 2.0 | 10.7 | B | A |

TABLE 1-continued

| | | | | | Separator | | | | | | |
|---|---|---|---|---|---|---|---|---|---|---|---|
| | | | | | | | Porous layer | | | | |
| | | DSC tem- | | | | | | Film thickness | Measurement and evaluation | | |
| | Film | perature | | | | | | of porous | | Dis- | Heat |
| Film thickness [μm] | resistance [Ω·cm²] | difference [°C.]*1 | Porous substrate | Coating surface | Resin | Inorganic particle | | layer [μm] | Macmillan number | charge ability | resis-tance |
| Comparative Example 5 | 9.0 | 1.80 | 0.89 | F | One side | Meta-aramid | BaSO₄ | 2.0 | 10.8 | B | A |

*1DSC temperature difference: absolute value of difference between temperature of edothermic peak observed at 120° C. to 145° C. in temperature raising process 1 and temperature of endothermic peak observed at 120° C. to 145° C. in temperature raising process 2

As shown in Table 1, in Examples, the porous layer contained the specific resin, and the difference in temperature between the endothermic peaks of the porous substrate at the time of heating twice satisfied the specific range, so that preferable film resistance was achieved as compared with Comparative Examples. That is, it can be evaluated that the separator of Examples is excellent in the impregnation property of the electrolytic solution. As a result, the affinity with the electrolytic solution in the separator is improved, and the impregnation property of the electrolytic solution is enhanced. Therefore, the dischargeability of Examples is also higher than that of Comparative Examples.

The disclosure of Japanese Patent Application No. 2020-034134 filed on Feb. 28, 2020 is incorporated herein by reference in its entirety.

All publications, patent applications, and technical standards described herein are incorporated by reference herein to the same extent as if specifically and individually stated to be incorporated by reference.

The invention claimed is:

1. A separator for a non-aqueous secondary battery, the separator comprising:

a porous substrate including a polyethylene microporous film; and a porous layer that is provided on only one side of the porous substrate, and that contains a resin having at least one bonding group selected from the group consisting of an amide bond, an imide bond, and a sulfonyl bond, wherein, the porous substrate has a crystalline structure, and in the porous substrate, an absolute value of a difference between a temperature of an endothermic peak observed at from 120° C. to 145° C., in a temperature raising process 1, and a temperature of an endothermic peak observed at from 120° C. to 145° C., in a temperature raising process 2, is from 1.50° C. to 5° C., in differential scanning calorimetry (DSC) measurement, wherein the DSC measurements are performed continuously by raising the temperature from 30° C. to 200° C. at a temperature change rate of 5° C./min in a nitrogen atmosphere as the temperature raising process 1, lowering the temperature from 200° C. to 30° C. and raising the temperature from 30° C. to 200° C., as the temperature raising process 2, without providing a pause time between the temperature raising process 1 and the lowering, and between the lowering and the temperature raising process 2, and wherein a Macmillan number Mn determined by the following formula is 10 or less:

$$Mn=(\sigma e)/(\sigma s)$$

$$\sigma s=t/Rm$$

wherein σe represents a conductivity (S/m) of an electrolytic solution at 20° C. obtained by dissolving 1 mol/l of LiPF₆ in a mixed solvent composed of ethylene carbonate and propylene carbonate in a mass ratio of 1:1, σS represents a conductivity (S/m) of the separator impregnated with the electrolytic solution at 20° C., t represents a film thickness (m), and Rm represents a film resistance (ohm-cm²) of the separator.

2. The separator for a non-aqueous secondary battery according to claim 1, wherein the porous layer contains inorganic particles.

3. The separator for a non-aqueous secondary battery according to claim 1, wherein the resin contains a wholly aromatic polyamide.

4. The separator for a non-aqueous secondary battery according to claim 1, wherein the porous layer has a thickness of from 0.3 μm to 5.0 μm.

5. The separator for a non-aqueous secondary battery according to claim 1, wherein the resin is provided inside a pore of the porous substrate.

6. The separator for a non-aqueous secondary battery according to claim 1, wherein the porous substrate has an average pore size of 20 nm to 100 nm.

7. The separator for a non-aqueous secondary battery according to claim 1, wherein the porous substrate has an average pore size of 20 nm to 90 nm.

8. The separator for a non-aqueous secondary battery according to claim 1, wherein the porous substrate has an average pore size of 20 nm to 80 nm.

9. The separator for a non-aqueous secondary battery according to claim 1, wherein the porous layer has an average pore size of 10 nm to 300 nm.

10. A non-aqueous secondary battery that obtains electromotive force by lithium doping and dedoping, the non-aqueous secondary battery comprising:

a positive electrode;

a negative electrode;

the separator for a non-aqueous secondary battery according to claim 1 disposed between the positive electrode and the negative electrode; and an electrolytic solution in which a lithium salt is dissolved in a solvent containing a cyclic carbonate in an amount of 90% by mass or more based on a total mass of the solvent.

*    *    *    *    *